US011292373B2

(12) United States Patent
Doorgah et al.

(10) Patent No.: US 11,292,373 B2
(45) Date of Patent: Apr. 5, 2022

(54) SEAT FOR MOTOR VEHICLE

(71) Applicant: Faurecia Sièges d'Automobile, Nanterre (FR)

(72) Inventors: Naraindranath Doorgah, Ollainville (FR); Nordine Bouziane, Chilly Mazarin (FR)

(73) Assignee: FAURECIA SIÉGES D'AUTOMOBILE, Nanterre (FR)

( * ) Notice: Subject to any disclaimer, the term of this patent is extended or adjusted under 35 U.S.C. 154(b) by 98 days.

(21) Appl. No.: 16/414,900

(22) Filed: May 17, 2019

(65) Prior Publication Data
US 2019/0359101 A1 Nov. 28, 2019

(30) Foreign Application Priority Data

May 25, 2018 (FR) ...................................... 18 54430

(51) Int. Cl.
*B60N 2/68* (2006.01)
*B60N 2/02* (2006.01)

(52) U.S. Cl.
CPC ...... *B60N 2/682* (2013.01); *B60N 2002/0264* (2013.01)

(58) Field of Classification Search
CPC .................. B60N 2/682; B60N 2002/0264
See application file for complete search history.

(56) References Cited

U.S. PATENT DOCUMENTS

| 4,907,498 | A  | * | 3/1990  | Haufe    | B60H 3/0071  |
|           |    |   |         |          | 361/231      |
| 6,310,407 | B1 | * | 10/2001 | Saito    | B60N 2/002   |
|           |    |   |         |          | 307/10.1     |
| 8,028,786 | B2 | * | 10/2011 | Takayasu | G01G 19/4142 |
|           |    |   |         |          | 180/273      |
| 9,579,993 | B2 | * | 2/2017  | Watanabe | B60N 2/073   |
| 9,956,596 | B2 | * | 5/2018  | Becker   | B05D 3/06    |
| 9,987,950 | B2 | * | 6/2018  | Yadav    | H01R 13/73   |
| 2002/0105175 | A1 | * | 8/2002 | Lewis    | B60R 21/18   |
|           |    |   |         |          | 280/733      |
| 2007/0290535 | A1 | * | 12/2007 | Meredith | B60N 2/507  |
|           |    |   |         |          | 297/217.1    |

(Continued)

FOREIGN PATENT DOCUMENTS

CN 106826106 A * 6/2017
CN 106828215 A * 6/2017

(Continued)

OTHER PUBLICATIONS

French Search Report corresponding to French application No. FR1854430, dated May 25, 2018, 9 pages.

*Primary Examiner* — Timothy J Brindley
(74) *Attorney, Agent, or Firm* — Reising Ethington P.C.

(57) ABSTRACT

A motor vehicle seat having a metal frame, the seat defining a volume (V). The frame is configured to be electrically connected to a chassis of the motor vehicle so as to generate a Faraday effect. The seat includes an electronic and/or electrotechnical device having at least one electronic control unit and/or a motor connected to a power cable. The cable is intended for connection to a power supply of the motor vehicle for the at least one electronic control unit and/or motor. The electronic and/or electrotechnical device is at least partially arranged within the volume (V) of the seat.

11 Claims, 2 Drawing Sheets

(56) References Cited

U.S. PATENT DOCUMENTS

| | | | | |
|---|---|---|---|---|
| 2009/0184199 | A1* | 7/2009 | Leisten | B64D 45/02 244/1 A |
| 2010/0080958 | A1* | 4/2010 | Goelling | B32B 15/18 428/172 |
| 2011/0014863 | A1* | 1/2011 | Foster | H04K 3/415 455/1 |
| 2011/0022274 | A1* | 1/2011 | Jefferies | B60N 2/0232 701/45 |
| 2012/0100414 | A1* | 4/2012 | Sonta | H01M 50/20 429/163 |
| 2013/0329372 | A1* | 12/2013 | Wilkins | H05K 7/20445 361/725 |
| 2014/0042789 | A1* | 2/2014 | Kitaguchi | B60N 2/015 297/344.1 |
| 2016/0297383 | A1* | 10/2016 | Pike | B60R 16/03 |
| 2017/0057389 | A1* | 3/2017 | Dickerman | B60N 2/58 |
| 2018/0126883 | A1* | 5/2018 | Sakaguchi | B60N 2/682 |
| 2020/0353807 | A1* | 11/2020 | Kellner | H01M 10/625 |

FOREIGN PATENT DOCUMENTS

| | | | | | |
|---|---|---|---|---|---|
| CN | 214164775 | U | * | 9/2021 | |
| DE | 102007048190 | A1 | | 1/2009 | |
| FR | 2986773 | A1 | * | 8/2013 | B60R 21/026 |
| JP | 2011244569 | A | | 12/2011 | |
| WO | WO-2021005867 | A1 | * | 1/2021 | F16C 33/66 |

* cited by examiner

SEAT FOR MOTOR VEHICLE

TECHNICAL FIELD

The invention relates to a seat for a motor vehicle.

BACKGROUND

A seat generally comprises a metal frame defining a volume and supporting a trim.

In a known manner, such a frame serves as a support structure for the backrest and seating portion of the seat.

These days, a motor vehicle carries multiple embedded electronic and/or electrotechnical devices of various power, which are all sources of electromagnetic waves.

These sources radiate into the passenger compartment of the vehicle, generating interference that disrupts the operation of the devices.

This problem is growing due to the current trend of increasing the number of electrotechnical devices, in particular with feature automation and the growth of electric vehicles.

SUMMARY

One aim of the invention is to at least partially remedy this disadvantage.

For this purpose, an object of the invention is to provide a motor vehicle seat comprising a metal frame, the seat defining a volume, said frame being configured to be electrically connected to a chassis of the motor vehicle so as to generate a Faraday effect, the seat comprising an electronic and/or electrotechnical device comprising at least one electronic control unit and/or a motor connected to a power cable, said cable being intended for connection to a power supply of the motor vehicle for said at least one electronic control unit and/or a motor, said electronic and/or electrotechnical device being at least partially arranged within said seat volume.

Thus, any electromagnetic radiation emitted by the electronic device is greatly reduced or even becomes zero outside said volume, thereby protecting the operation of the various devices of the vehicle, including the operation of the electronic device itself.

The seat can comprise at least one rail integral with the seat frame, said at least one rail being locally or entirely devoid of a layer of paint or being provided with a layer of electrically conductive paint.

According to another feature of the invention, said at least one electronic control unit is arranged within said volume, the power cable being partially arranged within said volume.

According to another feature of the invention, the electronic device and/or is in at least partial contact with the metal frame of the seat.

According to another feature of the invention, the cable is in contact with the metal frame of the seat for a length of at least 5 mm.

According to another feature of the invention, the cable is in contact with the metal frame of the seat for a length of at least 1 cm.

According to another feature of the invention, the cable is in contact with the metal frame of the seat for a length of at least 5 cm.

According to another feature of the invention, the cable is in contact with the metal frame of the seat for a length of at least 10 cm.

According to another feature of the invention, the frame has a chassis electrical contact resistance of less than 100Ω.

According to another feature of the invention, the contact resistance is less than 1Ω, preferably less than 0.5Ω.

BRIEF DESCRIPTION OF THE DRAWINGS

Other features and advantages of the invention will be apparent from reading the description which follows. This is purely illustrative and is to be read with reference to the attached drawings in which.

DETAILED DESCRIPTION

Seat

Figure 1:
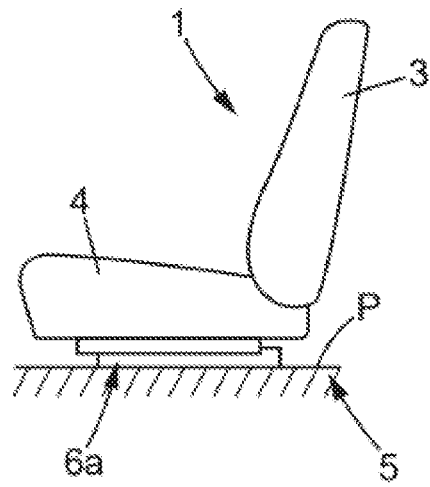
FIG. 1 illustrates a schematic side view of a motor vehicle seat.

As illustrated in FIG. 1, a seat 1 comprises a backrest 3 and a seating portion 4 on which for example the backrest 3 can be mounted.

The seating portion 4 rests on a floor P of a chassis 5 of the motor vehicle.

The seating portion 4 is connected to the floor P by a system of rails, comprising rails 6 advantageously arranged parallel to each other and respectively extending in a longitudinal direction X. In particular, a single rail 6a is visible in FIG. 1.

Figure 2:
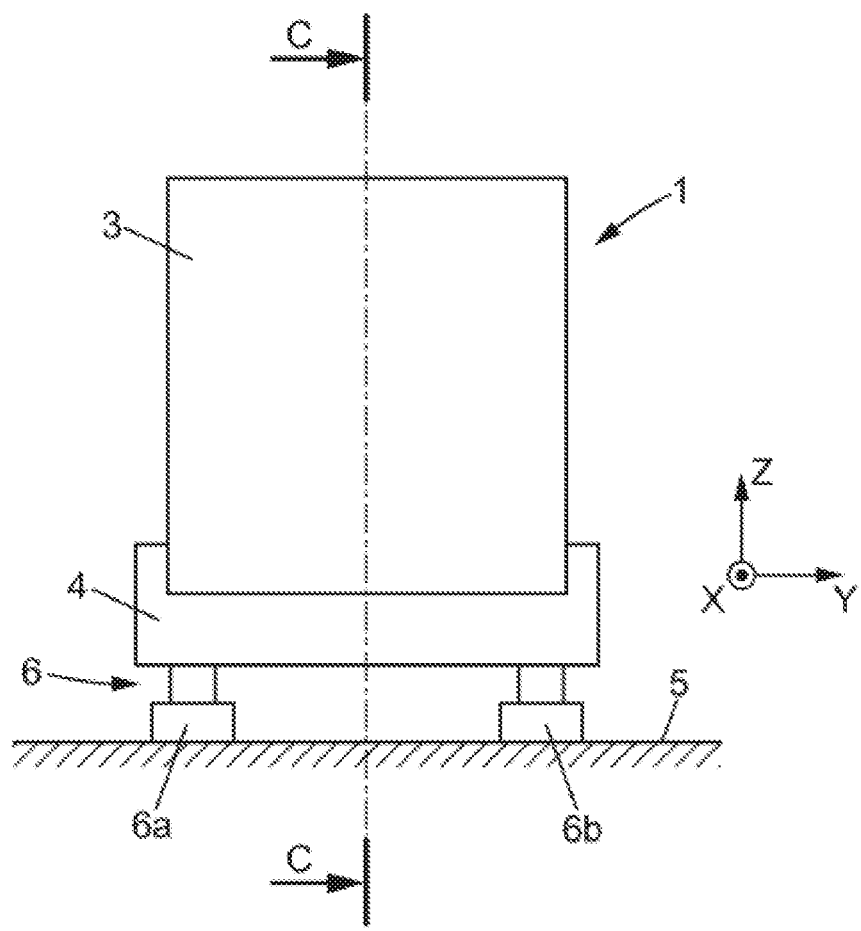
FIG. 2 is a rear view of the seat of FIG. 1.

According to a particular embodiment as shown in FIG. 2, the system of rails 6 comprises in particular a first rail 6a and a second rail 6b, preferably parallel. Alternatively, in other embodiments, the system of rails 6 may comprise a single rail, or more than two rails.

A transverse direction Y is defined as being perpendicular to a longitudinal direction X. More specifically, the transverse direction Y and the longitudinal direction X may for example substantially lie within a horizontal plane of extension of the floor P of the vehicle.

As for the direction Z, it is vertical.

Figure 3:
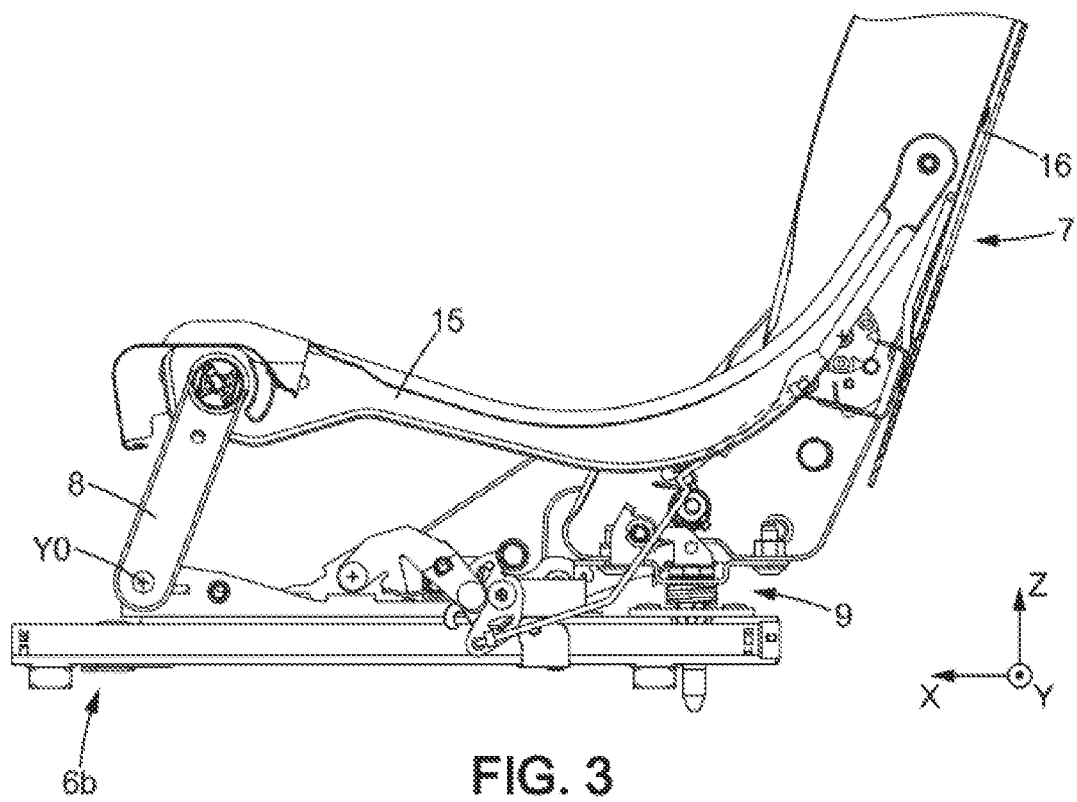
FIG. 3 is a sectional view along axis C-C of the seat of FIG. 2.

As can be seen in FIG. 2, the seat 1 further comprises a seat frame 7 supporting the seat trim 1. As shown at 8 in FIG. 3, which is a sectional view along axis CC of FIG. 2, the seat frame 7 is fixed to the system of rails 6.

The seat frame 7 is for example mounted on the system of rails 6 at a front end by a connecting rod 8 which can advantageously pivot relative to the system of rails 6, about a pivot axis Y0. Thus, according to one embodiment, the seat 1 can tilt by pivoting forwards and/or backwards about the pivot axis Y0.

The seat frame 7 may further comprise a releasable attachment 9 at a rear end of the system of rails 6 which is then unlocked to allow the seat 1, and in particular the seat frame 7, to tilt relative to the floor of the vehicle. The unlocking of the releasable attachment 9 is for example actuated by a first control member (not shown) located on the seat frame 7.

The seat frame 7 further comprises a seating portion frame 15 and a backrest frame 16.

Means for Faraday effect

As can be seen from the figures, the seat 1 defines an internal volume V.

The seat 1 is electrically connected to the chassis 5 of the motor vehicle.

Advantageously, the frame 7 has a chassis electrical contact resistance of less than 100Ω, preferably less than 50Ω, and more preferably less than 5Ω or even 1Ω.

To ensure the electrical connection and allow the Faraday effect, the rails 6 are not painted, at least locally, or are painted with an electrically conductive paint.

When the rails are painted with an electrically insulating paint, areas without paint are chosen for connecting the seat to the chassis 5 of the vehicle.

In addition, one can use a means 22 for fastening the rails 6 to the floor P, the means 22 being electrically conductive.

In the illustrated embodiment, the fastening means 22 is a screw.

Advantageously, routing is performed around the hole of the chassis 5 intended to receive the screw 22, in order to ensure direct contact between the screw 22 and the chassis.

Preferably, the metal frame 7 is completely devoid of paint.

Alternatively, if the metal frame 7 is painted with an electrically insulating paint, it is only partially painted and areas without paint are provided to ensure the electrical connection.

Figure 4:
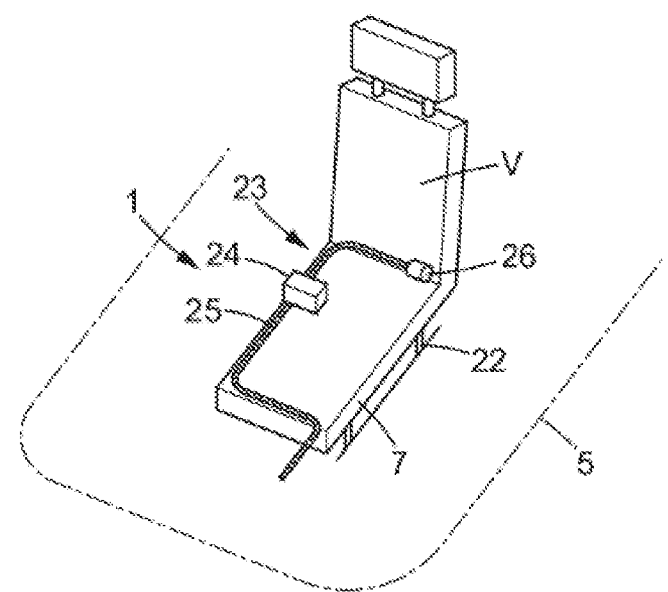
FIG. 4 illustrates a perspective view of the seat of FIG. 1.

As can be seen in FIG. 4, the seat 1 also comprises an electronic and/or electrotechnical device 23.

The electronic and/or electrotechnical device 23 comprises at least one electronic control unit and a power cable for said at least one electronic control unit.

In the illustrated embodiment, the electronic and/or electrotechnical device 23 comprises a single electronic control unit 24.

The power cable is referenced 25.

The control unit 24 is intended to control a terminal 26.

The control unit 24 is for example in the form of a circuit board.

The terminal 26 is an actuator for a motor in FIG. 4.

Of course, the invention is not limited to this case, and it is possible that the terminal 26 is a pneumatic system.

The motor 26 enables multiple applications: it is for example a motor dedicated to moving the seat on its tracks, or folding the seat, or a massage function.

For example, the control unit 24 supplies the motor 26 with a PWM (Pulse Width Modulation) type of chopped signal.

This type of signal is rich in harmonics, and therefore generates an electromagnetic field.

The same is true for the power cable 25.

The power cable 25 connects an electrical source, such as the electric battery of the motor vehicle (not shown), to the unit 24, and the unit 24 to the motor 26.

The electronic and/or electrotechnical device is at least partially arranged within the volume V, so that the electromagnetic radiation emitted by the electronic device is reduced or even becomes zero outside the volume.

The electromagnetic radiation emitted by the unit 24 and/or the cable 25 thus does not interfere with the operation of other devices of the motor vehicle.

In FIG. 4, the unit 24 is arranged entirely within the volume V, while the cable 25 is partially within the volume V.

Advantageously, the electronic and/or electrotechnical device 23 is at least partially in direct contact with the metal frame 7 of the seat.

In FIG. 4, the cable 25 is in direct contact with the metal frame 7 of the seat.

The cable 25 is advantageously bonded to the frame 7.

The length of the direct contact (bond) is advantageously at least 5 mm, preferably at least 1 cm or at least 5 cm, more preferably at least 10 cm.

The disclosed minimum lengths for the direct contact greatly reduce the electromagnetic radiation due to the cable 25, outside the volume V.

Thus, as already indicated, the metal frame 7 provides a Faraday effect which reduces the electromagnetic field generated by the electronic and/or electrotechnical device 23 and ensures normal operation of the other devices of the vehicle.

As used in this specification and claims, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A motor vehicle seat comprising a metal frame, the seat defining a volume and an electronic and/or electrotechnical device comprising at least one electronic control unit and/or a motor connected to a power cable, said cable being connectable to a power supply of the motor vehicle for said at least one electronic control unit and/or motor, said electronic and/or electrotechnical device being at least partially arranged within said volume of the seat,
wherein said metal frame is configured to be electrically connected to a chassis of the motor vehicle so as to generate an electromagnetic shielding effect to at least partly block electromagnetic radiation emitted by the electronic and/or electrotechnical device from being emitted outside said volume,
wherein the seat comprises at least one rail integral with the seat frame, said at least one rail being partially painted, wherein one or more areas without paint of the at least one rail connect the seat to the chassis.

2. The seat according to claim 1, wherein the at least one rail is partially painted with a layer of electrically conductive paint.

3. The seat according to claim 1, wherein said at least one electronic control unit is arranged within said volume, the power cable being partially arranged within said volume.

4. The seat according to claim 1, wherein the electronic and/or electrotechnical device is in at least partial contact with the metal frame of the seat.

5. The seat according to claim 1, wherein the cable is in contact with the metal frame of the seat for a length of at least 5 mm.

6. The seat according to claim 1, wherein the cable is in contact with the metal frame of the seat for a length of at least 1 cm.

7. The seat according to claim 1, wherein the cable is in contact with the metal frame of the seat for a length of at least 5 cm.

8. The seat according to claim 1, wherein the cable is in contact with the metal frame of the seat for a length of at least 10 cm.

9. The seat according to claim 1, wherein the frame has a chassis electrical contact resistance of less than 100Ω.

10. The seat according to claim 9, wherein the chassis electrical contact resistance is less than 1Ω.

11. The seat according to claim 9, wherein the chassis electrical contact resistance is less than 0.5Ω.

* * * * *